US012549456B2

(12) United States Patent
Doan et al.

(10) Patent No.: US 12,549,456 B2
(45) Date of Patent: Feb. 10, 2026

(54) MULTI-CLOUD SUSTAINABILITY-BASED SERVERLESS FUNCTION DEPLOYMENT

(71) Applicant: Cisco Technology, Inc., San Jose, CA (US)

(72) Inventors: Quynhnhu Doan, Houston, TX (US); Chris Adams, Hampshire (GB); Davide Pacifico, Pescara (IT); Anna Bennett, Harker Heights, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/332,153

(22) Filed: Jun. 9, 2023

(65) Prior Publication Data
US 2024/0414071 A1    Dec. 12, 2024

(51) Int. Cl.
*H04L 67/10*    (2022.01)
*H04L 41/50*    (2022.01)

(52) U.S. Cl.
CPC .............. *H04L 41/50* (2013.01); *H04L 67/10* (2013.01)

(58) Field of Classification Search
CPC ................................ H04L 41/50; H04L 67/10
See application file for complete search history.

(56) References Cited

U.S. PATENT DOCUMENTS

| | | | | |
|---|---|---|---|---|
| 11,743,119 B1 * | 8/2023 | Singi | ................... | H04L 41/5054 709/221 |
| 12,086,650 B2 * | 9/2024 | Ekins | .................... | G06F 9/5088 |
| 2011/0282982 A1 | 11/2011 | Jain | | |
| 2012/0271935 A1 | 10/2012 | Moon | | |
| 2014/0365402 A1 | 12/2014 | Belady et al. | | |
| 2018/0034924 A1 * | 2/2018 | Horwood | ................ | H04L 67/10 |
| 2022/0014602 A1 * | 1/2022 | Sai Sampath | ....... | H04L 63/0272 |
| 2022/0035680 A1 * | 2/2022 | Sharma | ............ | G06Q 10/06393 |
| 2022/0166670 A1 * | 5/2022 | Khanna | ................. | H04L 41/082 |
| 2023/0195444 A1 * | 6/2023 | Vohra | ...................... | G06F 9/455 717/172 |

FOREIGN PATENT DOCUMENTS

| | | | | |
|---|---|---|---|---|
| EP | 4057144 A1 * | 9/2022 | .............. | G06F 8/63 |
| WO | 2019213466 A1 | 11/2019 | | |
| WO | 2022066697 A1 | 3/2022 | | |

\* cited by examiner

*Primary Examiner* — Cheikh T Ndiaye
(74) *Attorney, Agent, or Firm* — Rutan & Tucker, LLP; Ravi Mohan; Marc McClain

(57) ABSTRACT

Devices, systems, methods, and processes for sustainably deploying serverless functions across the globe are described herein. Often, when considering sustainability options for cloud-based service providers that can accept and operate serverless functions from various sources, the power source type can be considered. In many cases, solar-powered power sources can be desired, but is only available during the day. Thus, it may be desirable to consider where the location of a cloud-based service provider is located in relation to the daylight time. Thus, various data related to the power being utilized to power the cloud-based service provider location can be determined and utilized when comparing potential locations to deploy serverless functions. In some cases, a sustainability score can be generated based on this sustainability data and a sustainability profile that can be compared against other locations to determine the most suitable cloud-based service provider to deploy the serverless function onto.

20 Claims, 8 Drawing Sheets

MULTI-CLOUD SUSTAINABILITY-BASED SERVERLESS FUNCTION DEPLOYMENT

The present disclosure relates to network management. More particularly, the present disclosure relates to deploying serverless functions across multiple cloud-based services based on sustainability data.

BACKGROUND

Serverless functions, also known as a serverless compute services or function-as-a-service (FaaS), are a cloud computing model that allows developers to write and execute code without the need to manage or provision servers. In a traditional server-based architecture, developers typically have to set up and manage the infrastructure required to run their applications, including servers, operating systems, and networking components.

In contrast, serverless functions abstract away the underlying infrastructure, enabling developers to focus solely on writing the code for their application's functionality. With serverless computing, developers can deploy their code to a cloud-based provider's serverless platform, which automatically takes care of scaling, resource allocation, and managing the execution environment.

When a serverless function is triggered, it is dynamically allocated the necessary resources to execute the code and respond to the event. This on-demand allocation of resources allows for efficient scaling, as resources are provisioned only when needed, and developers are billed based on the actual usage of their functions. For these reasons, the use of serverless functions is increasing in popularity.

Serverless functions are also typically designed to be stateless, meaning they do not maintain any persistent state between invocations. They are commonly used for event-driven and asynchronous tasks, such as processing data, responding to webhooks, handling API requests, or performing backend computations, among other tasks. Popular serverless function platforms include AWS Lambda, Azure Functions, Google Cloud Functions, and IBM Cloud Functions; however, other cloud-based services may also be suitable. Typically, decisions on which cloud-based serverless provider to deploy onto do not take any sustainability related factors into account.

SUMMARY OF THE DISCLOSURE

Systems and methods for deploying serverless functions across multiple cloud-based services based on sustainability data in accordance with embodiments of the disclosure are described herein. In some embodiments, a device, comprises a processor, a memory communicatively coupled to the processor, a communication port coupled with a plurality of cloud-based services, and a serverless function deployment logic. The serverless function deployment logic can be configured to determine at least one serverless function to deploy, gather data associated with the plurality of cloud-based services; access sustainability data, select a cloud-based service from the plurality of cloud-based services based on at least the accessed sustainability data, and deploy at least one serverless function to the selected cloud-based service.

In some embodiments, the serverless function deployment logic is further configured to: filter the plurality of cloud-based services based on at least one service level objective; and select a cloud-based service from the filtered plurality of cloud-based services based on at least the accessed sustainability data.

In some embodiments, the serverless function deployment logic is further configured to determine if the filtered plurality of cloud-based services has any infrastructure available.

In some embodiments, in response to the filtered plurality of cloud-based services having no available infrastructure, the serverless function deployment logic deploys the serverless function locally.

In some embodiments, in response to the filtered plurality of cloud-based services having available infrastructure, the serverless function deployment logic determines if the at least one serverless function is transfer compliant.

In some embodiments, in response to the serverless function not being transfer compliant, the serverless function deployment logic deploys the serverless function locally.

In some embodiments, in response to the serverless function not being transfer compliant, the serverless function deployment logic generates a sustainability score for each cloud-based service within the filtered plurality of cloud-based services.

In some embodiments, the serverless function deployment logic is further configured to generate a sustainability score for a current configuration.

In some embodiments, the serverless function deployment logic is further configured to determine if a sustainability score from the generated sustainability scores for the filtered plurality of cloud-based services is higher than the generated sustainability score associated with the current configuration.

In some embodiments, in response to a sustainability score associated with the filtered plurality of cloud-based services being higher than the sustainability score associated with the current configuration, the selection of the cloud-based service is based on the cloud-based service with a highest sustainability score.

In some embodiments, the sustainability data includes at least a location of the cloud-based services and their relation to a current optimal daylight pattern.

In some embodiments, the sustainability data includes at least: current solar photovoltaic intensity, emulated max latency, or carbon intensity data transfer cost.

In some embodiments, the sustainability data further includes projected estimates of the data associated with the plurality of cloud-based services.

In some embodiments, the sustainability data further includes historical data associated with the plurality of cloud-based services.

In some embodiments, a device, comprises a processor, a memory communicatively coupled to the processor, a communication port coupled with a plurality of candidate providers, and a serverless function deployment logic. The serverless function deployment logic can be configured to determine at least one serverless function to deploy, gather data associated with the plurality of candidate providers, access sustainability data, and generate a sustainability score for each of the plurality of candidate providers. The logic can also be configured to select the candidate provider with a highest sustainability score and deploy at least one serverless function to the selected candidate provider.

In some embodiments, the plurality of candidate providers are cloud-based service providers.

In some embodiments, the serverless function deployment logic is further configured to: filter the plurality of cloud-based service providers based on at least one service level objective; and generate a sustainability score for each of the filtered plurality of cloud-based service providers.

In some embodiments, a method of deploying serverless functions comprises determining at least one serverless function to deploy, gathering data associated with a plurality of candidate providers, accessing sustainability data, and generating a sustainability score for each of the plurality of candidate providers. Various methods may further include selecting the candidate provider with a highest sustainability score and deploying at least one serverless function to the selected candidate provider.

In some embodiments, the plurality of candidate providers are cloud-based service providers.

In some embodiments, the method further includes filtering the plurality of cloud-based service providers based on at least one service level objective; and generating a sustainability score for each of the filtered plurality of cloud-based service providers.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
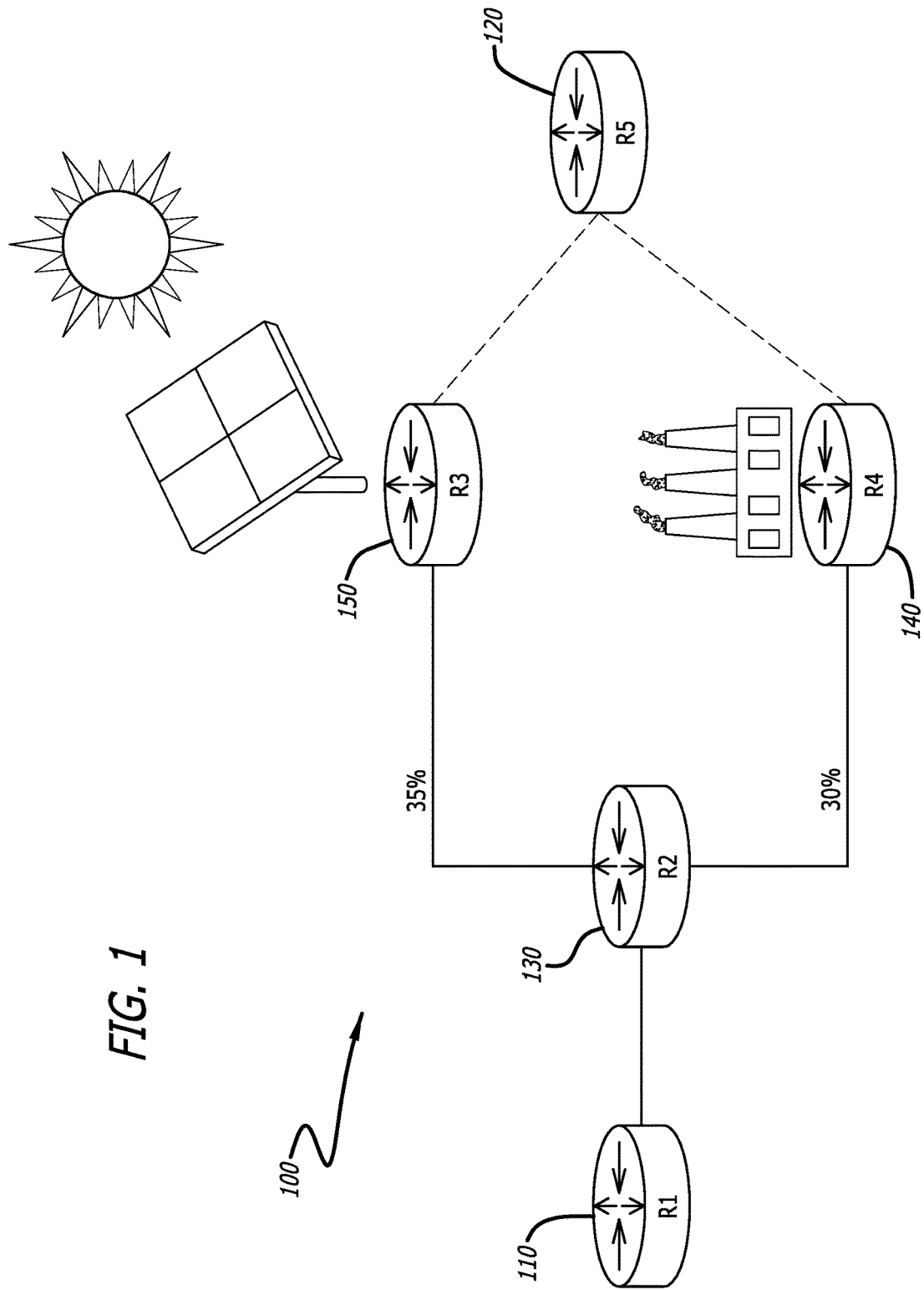
FIG. 1 is a conceptual diagram of a network comprising multiple network devices with various sources of power in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that determines a suitable cloud-based service provider to deploy serverless function onto based on one or more pieces of sustainability data. Modern applications are becoming increasingly complex and distributed. Within these applications, companies typically deploy serverless functions (e.g., to perform event-based tasks, batch processing, or asynchronous back-end processing, like file streaming or image processing). These serverless functions are often dynamically invoked, they are usually ephemeral and could be deployed across multiple cloud providers (e.g., in the form of Function as a Service or FaaS).

Traditionally, only performance, cost and/or affinity objectives (e.g., companies usually pay per on a consumption model basis per transaction) have been considered when deploying these functions. However, as the capabilities and use of serverless functions keep augmenting, their carbon footprint increases accordingly. Indeed, the challenge for many companies is not only to ensure that their operations are performant in an affordable manner but also that they align to corporate CO2E reduction targets.

While some organizations may currently prioritize cost and performance over corporate $CO_2E$ targets, others may gradually prioritize the latter. Ultimately, the goal of service owners is to ensure that the placement of serverless functions meets with corporate policy, including performance, cost, data regulations and compliance, while using the greenest energy available. Various embodiments described herein can leverage renewable energy sources in the energy mix, in line with performance, cost and corporate specific constraints, such as data must reside within a specific country or is prohibited from processing within specific countries.

In many embodiments, a sustainability profile may be created that includes one or more sustainability goals, rules, or other objectives that can be sought when deciding where to deploy serverless functions. Sustainability data can be gathered from various sources and evaluated against each other. The serverless function candidate locations can also be filtered by service level objective (SLO) restrictions, data privacy and other constraints, as well as those that are currently within day light, allowing for powering by a solar-powered sustainable source.

In more embodiments, the sustainability data can be configured into a sustainability score. The sustainability score can be formatted such that a candidate cloud-based service provider can be evaluated upon which location has the highest (or lowest) sustainability score. Thus, comparison against many candidate locations can be completed more easily. However, the sustainability score may also include other non-sustainability data, if desired.

A decision engine, or other deployment logic may leverage various algorithms selectable by the user for determining which provider, cloud region, and datacenter may be chosen to execute serverless functions. The method considers a mix of renewable energy sources, like wind, solar and hydro, business affinity, data compliance rules and the carbon footprint of moving the data required for the processing. For instance, the map below illustrates where the functions might be deployed, across multi-cloud regions/providers at any given time of day, considering among other elements, e.g., the solar intensity strength.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising,"

"having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a network comprising multiple network devices with various sources of power in accordance with various embodiments of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Figure 2:
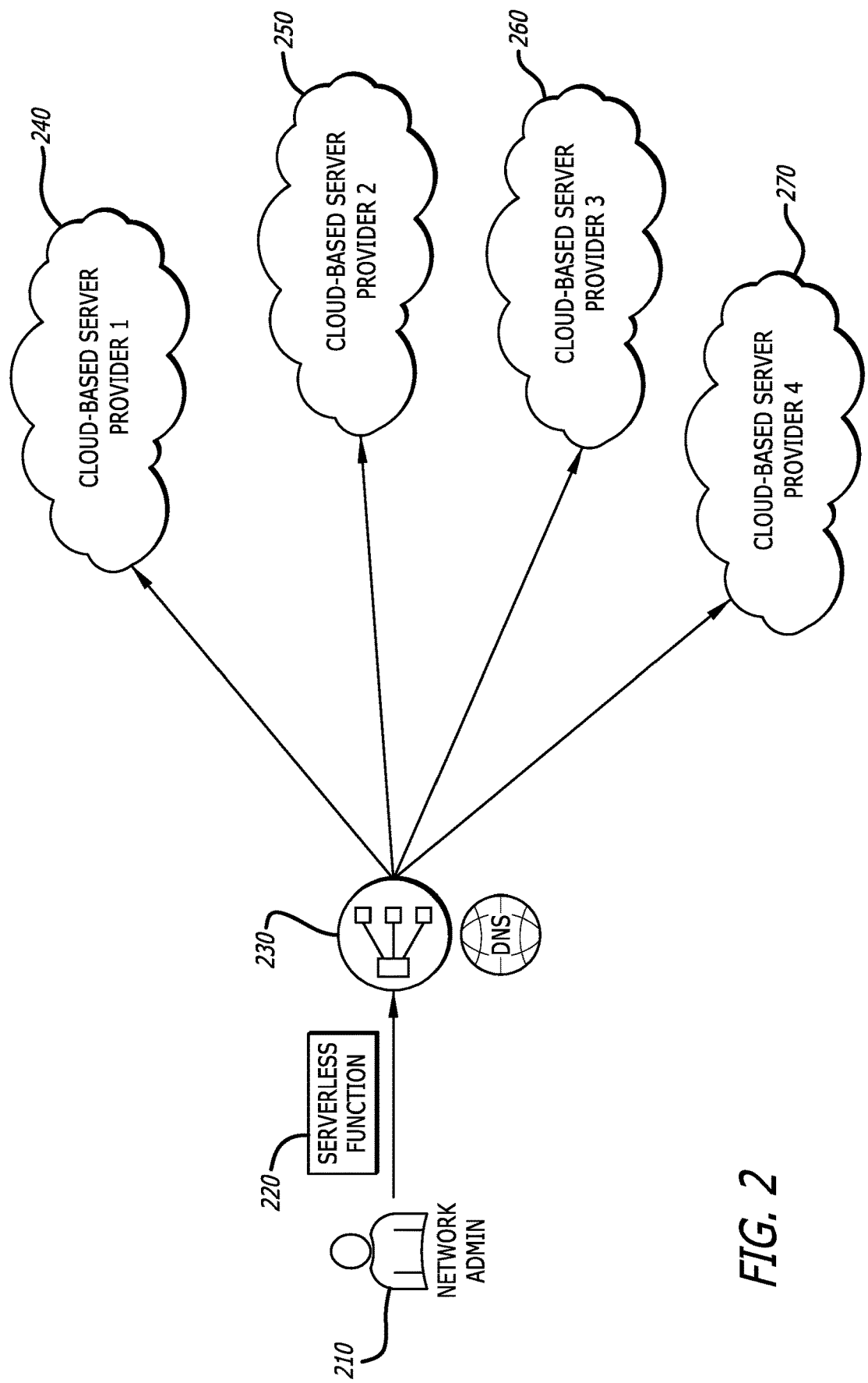
FIG. 2 is a conceptual diagram depicting the deployment of serverless functions to multiple cloud-based service providers in accordance with various embodiments of the disclosure.

Referring to FIG. 2, a conceptual diagram depicting the deployment of serverless functions to multiple cloud-based service providers in accordance with various embodiments of the disclosure is shown. In many embodiments, a network admin 210 can attempt to deploy one or more serverless functions 220. The serverless function 220 can be deployed on one or more various cloud-based service providers. In the embodiment depicted in FIG. 2, there is a first cloud-based service provider 240, a second cloud-based service provider 250, a third cloud-based service provider 260 and a fourth cloud-based service provider 270. However, as those skilled in the art will recognize, any number of cloud-based service providers may be utilized. Finally, in certain embodiments, the network admin 210 may utilize a decision engine 230 or type of deployment logic to make a decision on which cloud-based service provider is most suitable to receive the serverless function.

Typically, a network admin 210 would create an account with various cloud-based service providers, provide basic information and set up billing details. A development environment can be set up by installing the necessary tools and SDKs provided by the various cloud-based service providers to develop and deploy the serverless functions 220. These tools typically include command-line interfaces (CLIs) and development kits specific to the chosen platform.

After setting up your development environment, the network admin 210 can write and test the serverless function. This typically involves writing the code for the serverless function 220 using a supported programming language and ensuring it is stateless and handles input and output appropriately. The network admin 210 can test the serverless function 220 locally using development tools or emulators provided by the cloud platform. If the serverless function 220 has dependencies, they can be packaged along with your code using dependency management tools specific to the chosen programming language. Once the function code and dependencies are packaged, they can be configured with the appropriate triggers for the serverless function 220. These triggers can be events such as HTTP requests, database events, file uploads, or other event sources supported by the cloud-based service providers. You also configure permissions and access controls for the serverless function 220 to interact with other services or resources. After configuring the function triggers, you can deploy the serverless function 220 to the cloud-based service providers using the provided CLI and/or development tools.

To monitor and debug your serverless function 220, the network admin 210 can set up monitoring and logging using the tools and integrations provided by the cloud-based service platform. These tools help track function invocations, capture logs, and analyze performance metrics. For scaling and management, the network admin 210 can configure scaling options for the serverless function 220 to handle fluctuations in traffic. This can include specifying the desired concurrency, memory allocation, and timeout settings based on the desired requirements. As will be discussed in more detail below, additional metrics, such as sustainability-based metrics and data can be utilized to make decisions on management and deployment of the serverless function 220.

Although a specific embodiment for the deployment of serverless functions to multiple cloud-based service providers suitable for carrying out the various steps, processes, methods, and operations described herein is discussed with respect to FIG. 2, any of a variety of systems and/or processes may be utilized in accordance with embodiments of the disclosure. For example, there may be multiple decision engines 230 which may access various types of external data to make a deployment decision. The elements depicted in FIG. 2 may also be interchangeable with other elements of FIGS. 1 and 3-8 as required to realize a particularly desired embodiment.

Figure 3:
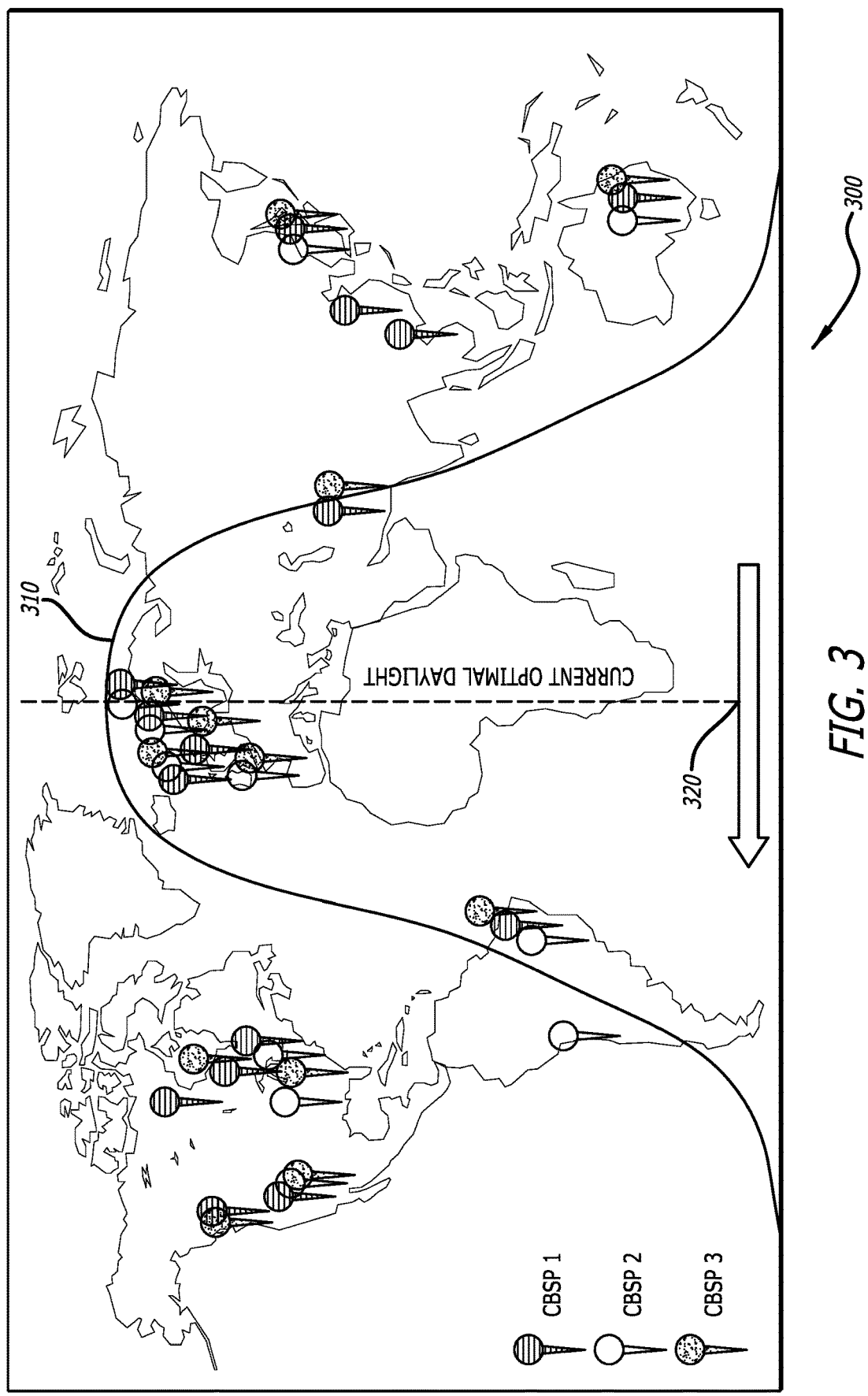
FIG. 3 is a conceptual diagram of a plurality of cloud-based service providers deployed across the world in accordance with various embodiments of the disclosure.

Referring to FIG. 3, a conceptual diagram 300 of a plurality of cloud-based service providers deployed across the world in accordance with various embodiments of the disclosure is shown. As those skilled in the art will recognize, cloud-based service providers can have locations deployed around the world. A representation of this is shown in the diagram 300 depicted in FIG. 3. A picture of the globe is shown with a bell-shaped curve indicating the current spread of daylight with a current optimal daylight divider 320. The diagram 300 depicted in FIG. 3 also has a key indicating the location marker types of three different cloud-based service providers (depicted as CPSP 1, CBSP 2, and CBSP 3). The diagram 300 indicates that each of the cloud-based service providers can have locations deployed all of the globe, and that each provider can have locations that are currently within or outside of the current daylight window of the Earth. As such, it should be recognized that when selecting a cloud-based service provider, it may be possible to select locations for deployment that are either currently in daylight or during nighttime.

Figure 4:
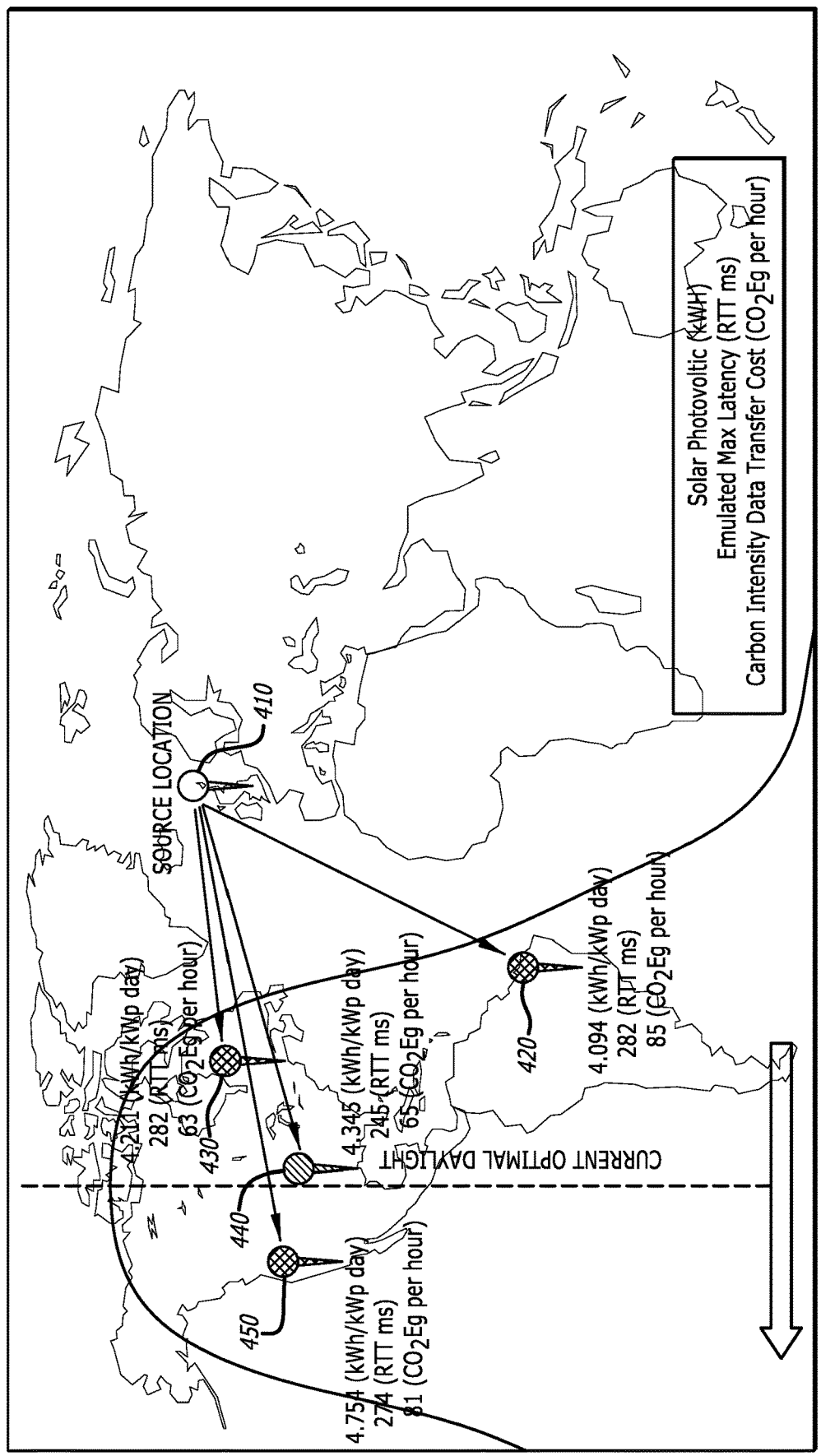
FIG. 4 is a conceptual diagram of evaluating multiple cloud-based service providers based on a plurality of sustainability-based data in accordance with various embodiments of the disclosure.

Referring to FIG. 4, a conceptual diagram 400 of evaluating multiple cloud-based service providers based on a plurality of sustainability-based data in accordance with various embodiments of the disclosure is shown. As shown in the embodiment shown in FIG. 3, it is possible for a single cloud-service provider to have locations that are located in areas that are currently covered by sunlight and others that are within nighttime hours. As such, the diagram 400 depicted in FIG. 4 shows a source location 410 that is currently attempting to select a location to deploy a serverless function onto.

In the embodiment shown in FIG. 4, there are four potential locations selected and being evaluated. Each of the four-candidate cloud-based service providers are located within the current daylight window of the planet and are powered sustainably through one or more solar-powered arrays. These arrays can have various ratings, data, and projected estimates of the data indicating the potential level of sustainability associated with each candidate location. As will be shown in more detail below, this can allow for the generation of a sustainability score that can be utilized to evaluate the best candidate for deploying a serverless function onto.

Solar photovoltaic capability refers to the capacity of a solar photovoltaic (PV) system to generate electricity from sunlight. It represents the maximum power output that the system can produce under ideal conditions. Solar PV capability is typically rated in terms of kilowatts (kW) or megawatts (MW). The energy output of a solar PV system over time is typically measured in kilowatt-hours (kWh), which represents the total amount of electricity generated by the system. The kWh rating is an indication of the system's energy production capacity over a given period, such as a day, month, or year.

Emulated max latency, in the context of cloud-based service providers, refers to the maximum simulated delay or latency that can be artificially introduced to mimic real-world network conditions. It is a measure of the highest latency that can be emulated or simulated within the cloud infrastructure. Latency refers to the time it takes for data to travel from a source to a destination over a network. It is typically measured in milliseconds (ms) and is commonly referred to as Round-Trip Time (RTT). RTT measures the time it takes for a packet of data to travel from the source to the destination and back again. By measuring emulated max latency in RTT, service providers can effectively evaluate and optimize their cloud-based services to deliver better performance and responsiveness under various network conditions.

Carbon intensity data transfer cost, often measured in $CO_2Eg$ (Carbon Dioxide Equivalent) per hour, refers to the amount of carbon emissions associated with transferring data over a network during a specific time period, typically an hour. It represents the environmental impact or carbon footprint of data transmission activities. Data transfer over networks requires energy consumption, which in turn leads to the release of carbon emissions into the atmosphere, primarily from the power generation sources that supply the energy. The carbon intensity data transfer cost quantifies the amount of $CO_2Eg$ emissions generated per unit of data transferred during a given time frame.

The first candidate cloud-based service provider 420 is shown to have ratings of 4.094 solar photovoltaic capability, 282 emulated max latency, and 85 carbon intensity data transfer cost (measured in $CO_2Eg$ per hour). The second candidate cloud-based service provider 430 is shown to have ratings of 4.211 solar photovoltaic capability, 282 emulated max latency, and 63 carbon intensity data transfer cost (measured in $CO_2Eg$ per hour). The third candidate cloud-based service provider 440 is shown to have ratings of 4.345 solar photovoltaic capability, 245 emulated max latency, and 65 carbon intensity data transfer cost. Finally, the fourth candidate cloud-based service provider 450 is shown to have ratings of 4.754 solar photovoltaic capability, 274 emulated max latency, and 81 carbon intensity data transfer cost (measured in $CO_2Eg$ per hour).

Depending on the desired metrics of deployment, each location may be desirable. For example, the third candidate cloud-based service provider 440 may be more desirable if latency was a major concern. However, the fourth candidate cloud-based service provider 450 may be the optimal choice if solar photovoltaic capacity was the main metric of evaluation. Each of these pieces of data can be evaluated manually by a network administrator, or in many embodiments, can be fed into a decision engine or other logic that can make these decisions on the fly and in response to dynamically changing conditions and data, such as, but not limited to, chasing the current optimal daylight.

Although specific embodiments for a deploying serverless functions across various cloud-based service providers across the globe are described herein with respect to FIGS. 3 and 4, any of a variety of systems and/or processes may be utilized in accordance with embodiments of the disclosure. For example, the decisions to optimize deployment locations may attempt to follow other sustainability-related dynamics, such as wind patterns, geo-thermal patterns, etc. The elements depicted in FIGS. 3 and 4 may also be interchangeable with other elements of FIGS. 1-2 and 5-8 as required to realize a particularly desired embodiment.

Figure 5:
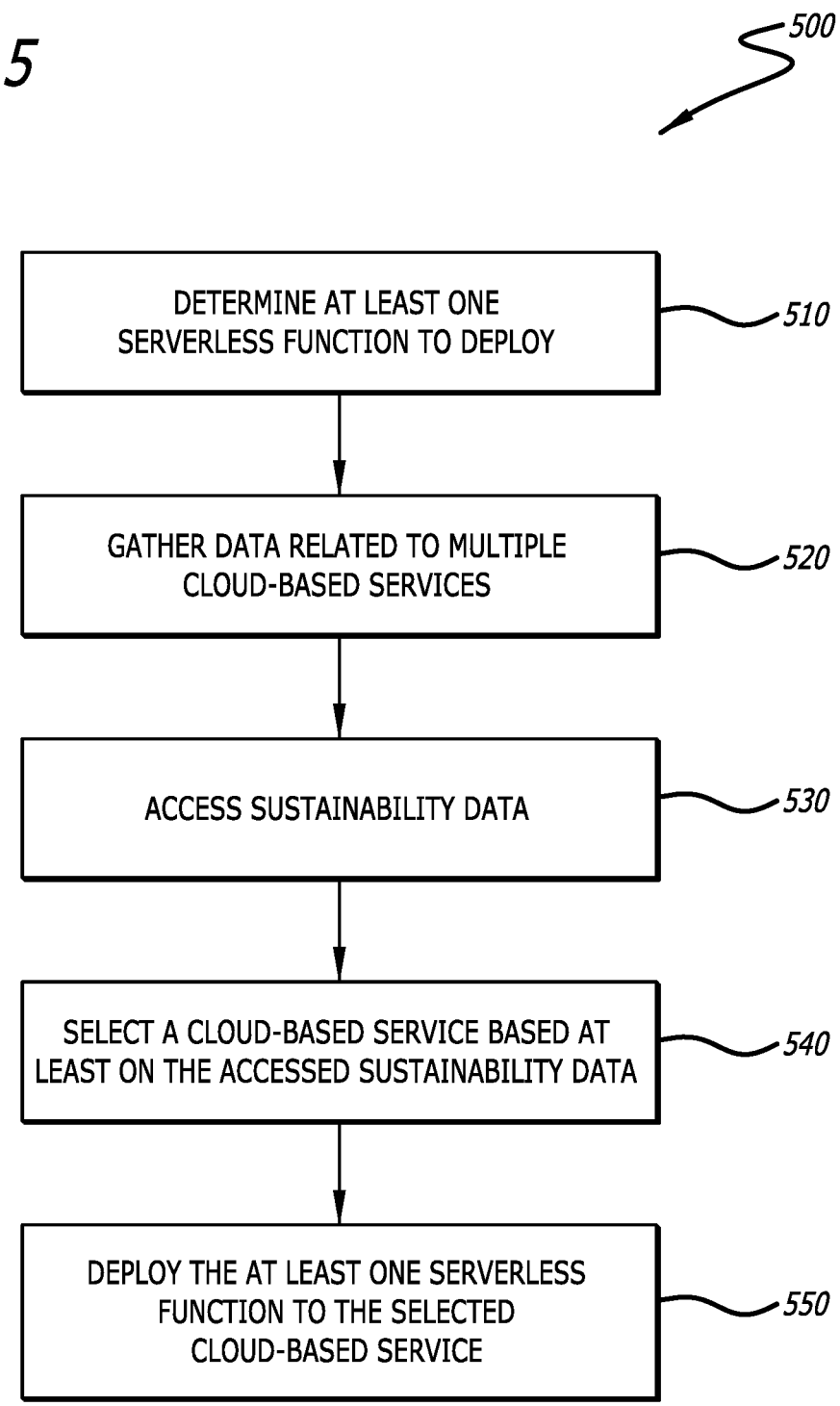
FIG. 5 is a flowchart depicting a process for deploying serverless functions to one or more cloud-based services in accordance with various embodiments of the disclosure.

Referring to FIG. 5, a flowchart depicting a process 500 for deploying serverless functions to one or more cloud-based services in accordance with various embodiments of the disclosure is shown. In many embodiments, the process 500 can determine at least one serverless function to deploy (block 510). As described in more detail above, some embodiments may utilize HTTP triggers, while other may utilize event-based triggers which can require setting up the event source and establishing the binding between the event and the function. As those skilled in the art will recognize, various other serverless functions can be deployed as well.

In more embodiments, the process 500 can gather data related to multiple cloud-based services (block 520). For example, data, such as the data shown in in FIG. 4 can be gathered from each of the candidate cloud-based service providers. Additional data may be static in nature and can be stored within a local database that can be accessed. Other third-party sources of data may be accessed as well depending on the data type desired.

In additional embodiments, the process 500 can access sustainability data (block 530). The sustainability data can be data that is accessed from third-party sources as well such as current or predicted weather conditions at each cloud-based service provider location, the carbon-mix of the power being provided to the cloud-based service provider location, etc. In some embodiments, the process 500 can process or otherwise parse data received from the cloud-based service provider location such as the data shown in FIG. 4 to create, determine, or otherwise process sustainability data.

In further embodiments, the process 500 can select a cloud-based service based at least on the accessed sustainability data (block 540). As described above with respect to FIG. 4, a various number of desired goals may be weighted or otherwise prioritized such that one location may be more desirable than another when evaluating cloud-based service provider locations. Depending on these various weighting, a network admin or some other automated logic can make the selection that is based on that accessed sustainability data.

In a number of embodiments, the process 500 can deploy the at least one serverless function to the selected cloud-based service (block 550). As those skilled in the art will recognize, serverless function deployments can vary based on various aspects, such as the function type. HTTP triggers can involve configuring endpoints and authentication. Event-based triggers can require event source setup, while scheduled functions need schedule specification, etc. Other specific types of serverless function deployments are also contemplated.

Although a specific embodiment for a process for deploying serverless functions to one or more cloud-based services suitable for carrying out the various steps, processes, methods, and operations described herein is discussed with respect to FIG. 5, any of a variety of systems and/or processes may be utilized in accordance with embodiments of the disclosure. For example, the selection may be based on both the sustainability data and a preselected list of locations that are within an optimal daylight pattern. The elements depicted in FIG. 5 may also be interchangeable with other elements of FIGS. 1-4 and 6-8 as required to realize a particularly desired embodiment.

Figure 6:
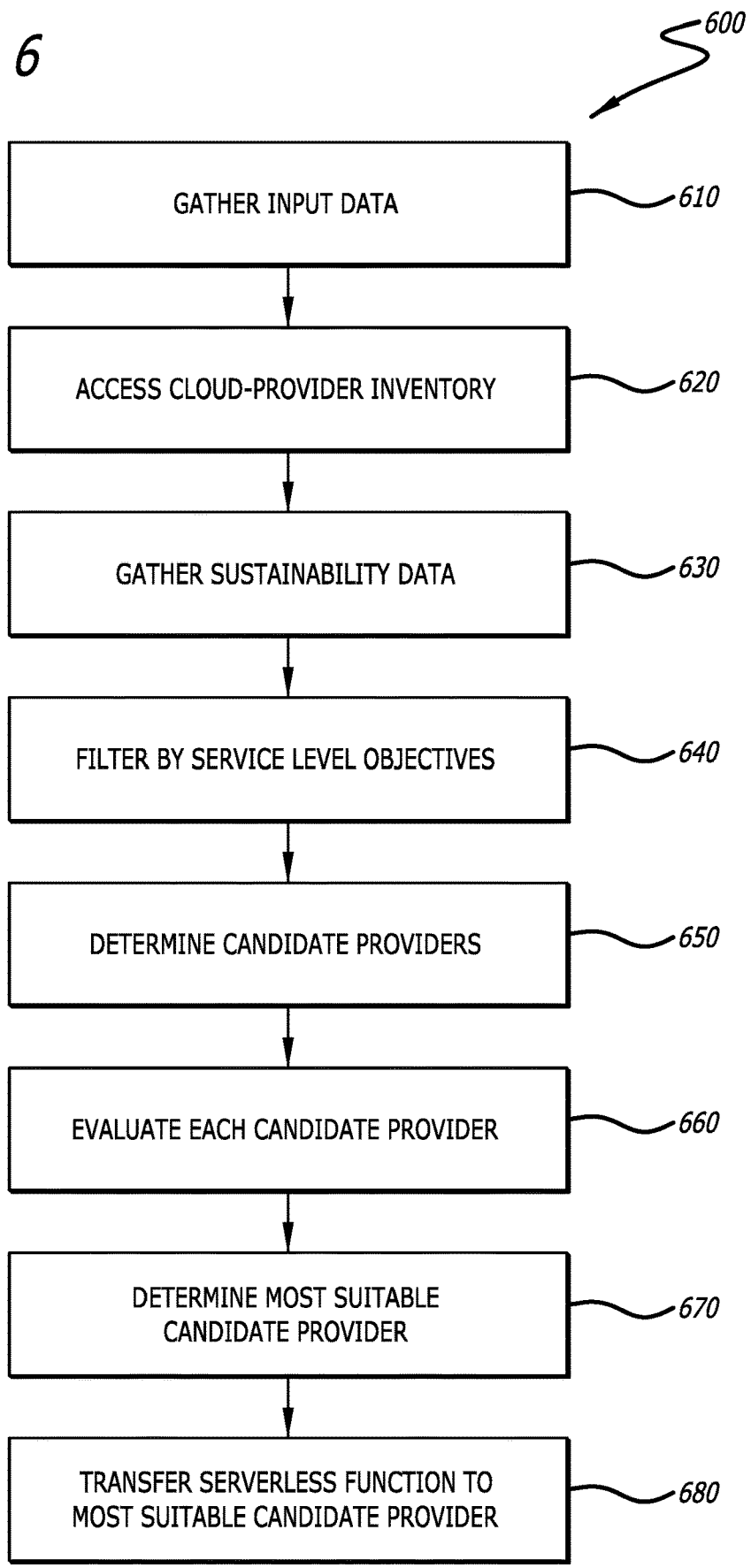
FIG. 6 is a flowchart depicting a process for transferring a serverless function to a suitable cloud-based service provider in accordance with various embodiments of the disclosure.

Referring to FIG. 6, a flowchart depicting a process 600 for transferring a serverless function to a suitable cloud-based service provider in accordance with various embodiments of the disclosure is shown. In many embodiments, the process 600 can gather input data (block 610). As discussed above, the transferring of a serverless function can be done by a network admin or by some sort of deployment logic. The deployment logic can utilize a variety of data sources when making a decision. In certain embodiments, the input data may include, but is not limited to, service level objective data (cost, performance affinity, etc.), metadata (data size, sensitive data category, etc.), as well as a sustainability profile that can guide sustainability-related decisions.

In further embodiments, the process 600 can access cloud-based provider inventory (block 620). Often, a serverless function logic can access a local database of various available locations associated with a plurality of cloud-based service providers. However, in some embodiments, the cloud-provider inventory can be accessed through a third-party.

In more embodiments, the process 600 can gather sustainability data (block 630). As described above with respect to FIG. 5, sustainability data can be data that is accessed from third-party sources, such as current or predicted weather conditions at each cloud-based service provider location, the carbon-mix of the power being provided to the cloud-based service provider location, etc. In some embodiments, the process 600 can process or otherwise parse data received from the cloud-provider inventory to create, determine, or otherwise generate sustainability data.

In additional embodiments, the process 600 can filter the cloud-provider inventory list by service level objectives (SLOs) (block 640). Based on the SLO required, the number of suitable candidate provider locations can be reduced as not every location may be able to meet the demands of the SLO. In some embodiments, multiple filters can be applied based on multiple SLOs or factors within an SLO.

In a number of embodiments, the process 600 can determine a plurality of candidate cloud-based service providers (block 650). Often, this can be done by taking an initial cloud-based service provider inventory and eliminating various options that will not satisfy one or more SLOs. In this way, after the various filters, of which others may be included, the resulting list can be a determined list of candidate providers.

In still more embodiments, the process can evaluate each candidate cloud-based service provider (block 660). In certain embodiments, this may include access various data about each location stored within a local database or third-party service. In some embodiments, each cloud-based service provider may be pinged for data such as the data depicted on FIG. 4. However, it is contemplated that other types of data may be accessed, requested, or otherwise determined.

In yet further embodiments, the process 600 can determine the most suitable candidate cloud-based service provider (block 670). Based on one or more desired outcomes, such as looking for the most sustainable option, or the most sustainable option that satisfies one or more SLOs or other technical requirements, a suitable candidate can be determined. In some embodiments, a sustainability profile can guide the weighting of the various pieces of data when determining the most suitable candidate provider. In more embodiments, a sustainability score can be calculated for each candidate provider and the location with the highest score can be selected.

In various embodiments, the process 600 can transfer the serverless function to the most suitable candidate provider (block 680). As described above, the transfer of the serverless function can include all of the necessary data to operate the function on the candidate provider's equipment. However, other types of transfers are contemplated as needed to fully transfer a serverless function to a suitable candidate provider.

Although a specific embodiment for a process for transferring a serverless function to a cloud-based service provider suitable for carrying out the various steps, processes, methods, and operations described herein is discussed with respect to FIG. 6, any of a variety of systems and/or processes may be utilized in accordance with embodiments of the disclosure. For example, the process may be carried out remotely from a centralized location or may occur at each location that may require deployment of serverless functions. The elements depicted in FIG. 6 may also be interchangeable with other elements of FIGS. 1-5 and 7-8 as required to realize a particularly desired embodiment.

Figure 7:
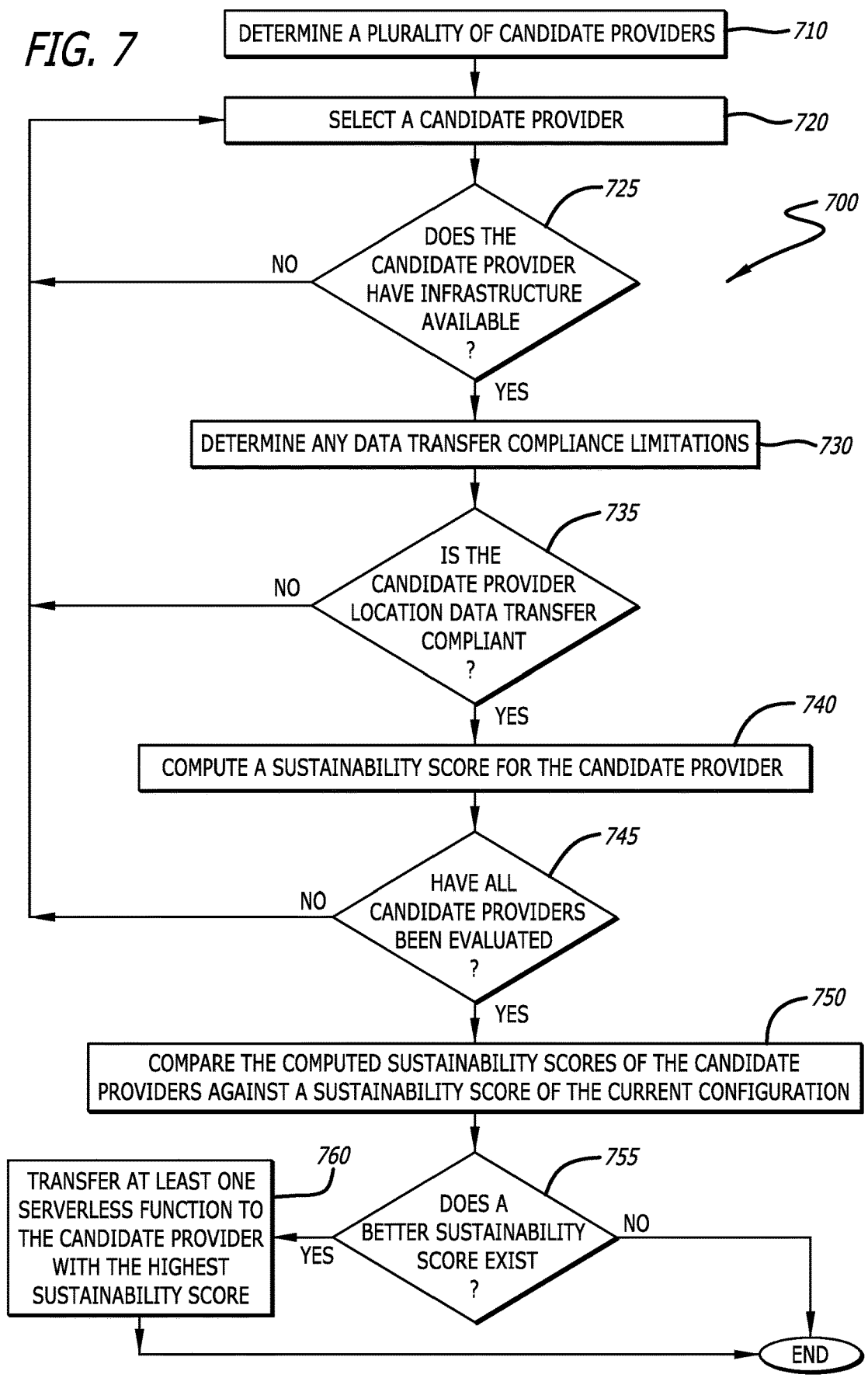
FIG. 7 is a flowchart depicting a process for transferring serverless functions to cloud-based service providers based on a computed sustainability score in accordance with various embodiments of the disclosure.

Referring to FIG. 7, a flowchart depicting a process 700 for transferring serverless functions to cloud-based service providers based on a computed sustainability score in accordance with various embodiments of the disclosure is shown. In many embodiments, the process 700 may determine a plurality of candidate providers (block 710). This determination can be done similarly to the determinations described above. In these embodiments, there may be a need to generate sustainability scores for each candidate provider.

In a number of embodiments, the process 700 can select a candidate provider (block 720). This can be done by selecting one candidate provider from the list of suitable candidate cloud-based service providers. In response to selecting a candidate provider, the process 700 can determine if the candidate provider has infrastructure available (block 725). This can be done by pinging the provider. Not every cloud-based service provider has sufficient infrastructure to provide for deploying the desired serverless function(s). As a result, if sufficient infrastructure is not available, the process 700 can select a new candidate provider (block 720).

However, when sufficient infrastructure is available, the process 700 can determine if any data transfer compliance limitations are present (block 730). Although serverless functions may be deployed externally and in various locations across the globe, the data that is processed by the serverless function may be subject to one or more privacy or other regulations that can limit the ability to deploy to various areas. As a result, the process 700 can determine if the candidate provider location is transfer compliant (block 735). If the cloud-based server location is not complaint with various data, the process 700 can select a new candidate provider (block 720).

However, when the data transfer would be compliant, the process 700 can compute a sustainability score for the candidate provider (block 740). Sustainability scores can be any heuristic of weights, rules, or other steps that can equate data or states with a numerical value. Based on factors such as a sustainability profile, the computation of the score can adjust weights on various aspects of the sustainability data. However, in certain embodiments, the computation of the sustainability score can also include aspects that are not directly related to sustainability but can be considered in conjunction with sustainability objectives. In more embodiments, the structure of the sustainability score may mean that a lower score is a better, more desirable score such that the candidate provider with the lowest score is selected.

In response to a sustainability score being computed, various embodiments of the disclosure can determine if all candidate providers have been evaluated (block 745). If all candidates have not been evaluated, the process 700 can again select a new candidate provider (block 720). However, if all candidate providers have been evaluated, the process 700 can compare the computed sustainability scores of the candidate providers against a sustainability score of the current configuration (block 750). In some embodiments, the serverless function can operate locally. It may be the case that operating the serverless function locally is more efficient/desirable than deploying it to a cloud-based service provider. In some embodiments, this step can ensure that deploying the serverless function to an external source makes sense. Therefore, it may be the case in a number of embodiments that the process 700 may generate or have access to a sustainability score for the local operation of the serverless function.

However, in yet additional embodiments, the process 700 can determine if a better sustainability score exists from the candidate providers (block 755). If a better score does not exist, then the process 700 can end and the serverless function can continue to operate locally. Conversely, when a better sustainability score is available, the process 700 can, in some embodiments, transfer at least one serverless function to the candidate provider with the highest sustainability score (block 760). As stated above, the evaluation may look at the lowest sustainability score in certain embodiments, depending on the structure and composition of the sustainability score. In more embodiments, the evaluation within the process 700 can be for the deployment of one serverless function, or many serverless functions as a package.

Although a specific embodiment for transferring serverless functions to cloud-based service providers based on a computed sustainability score suitable for carrying out the various steps, processes, methods, and operations described herein is discussed with respect to FIG. 7, any of a variety of systems and/or processes may be utilized in accordance with embodiments of the disclosure. For example, the process can be done locally, externally, or a combination of the two. Specifically, the generation of the sustainability score can be done externally while other aspects of the process 700 can occur locally. The elements depicted in FIG. 7 may also be interchangeable with other elements of FIGS. 1-6, and 8 as required to realize a particularly desired embodiment.

Figure 8:
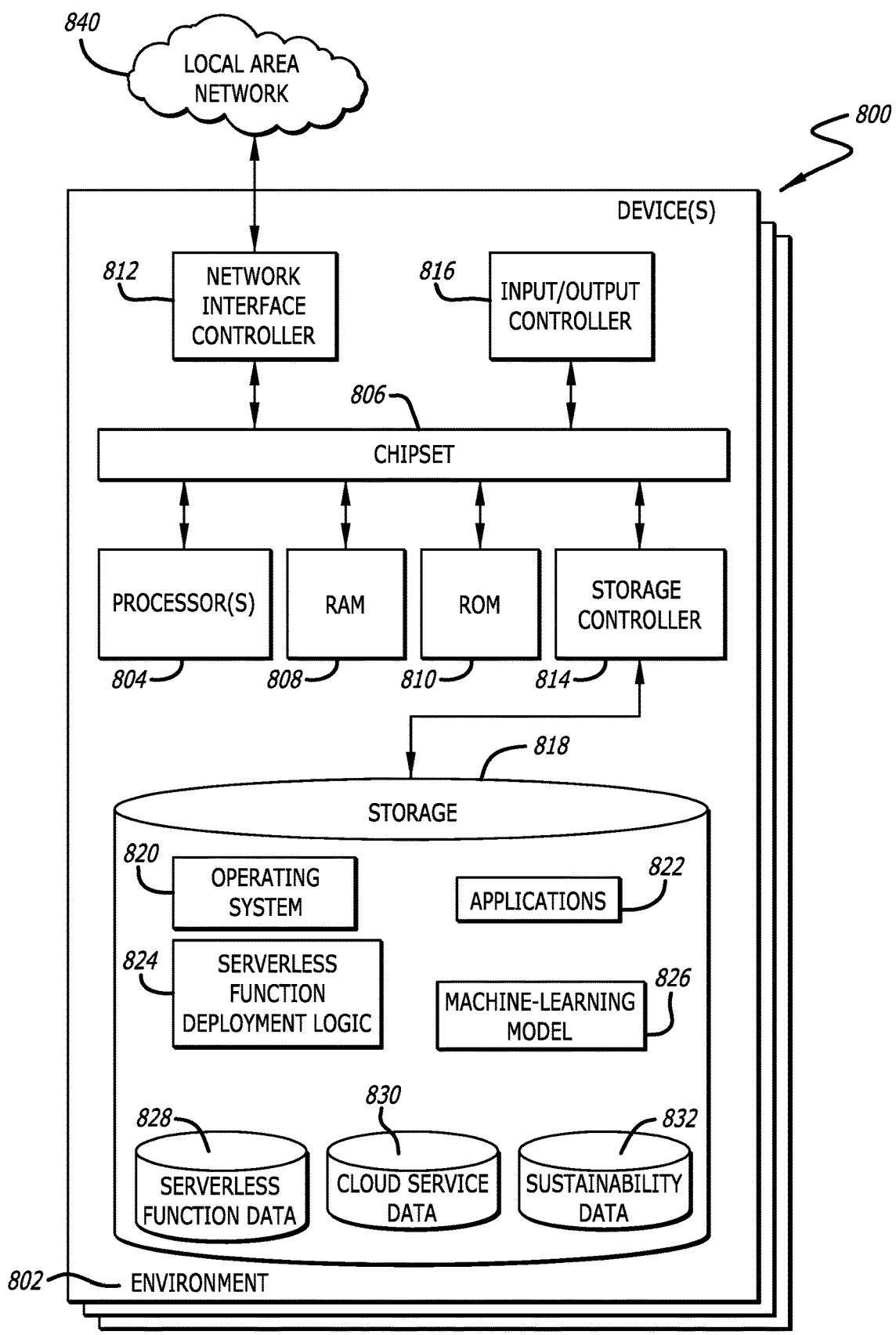
FIG. 8 is a conceptual block diagram of a device suitable for use in a sustainability-related serverless function deployment system in accordance with various embodiments of the disclosure.

Referring to FIG. 8, a conceptual block diagram of a device suitable for use in a sustainability-related serverless function deployment system in accordance with various embodiments of the disclosure is shown. The embodiment of the conceptual block diagram depicted in FIG. 8 can illustrate a conventional server computer, decision engine, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840 via one or more communication ports. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, and data 828, 830, 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a serverless function deployment logic 824. Typically, the serverless function deployment logic 824 is configured to process or otherwise execute the steps, methods, or processes needed to carry out the functions and actions described herein. In some embodiments, the serverless function deployment logic 824 can be a part of a larger software suite that can facilitate network administration, of which serverless function deployment is one part of.

In a number of embodiments, the storage 818 can include serverless function data 828. Often, the serverless function data 828 can include the data that needs to be deployed to the one or more cloud-based service providers. In this way, the serverless function data 828 can have pre-packaged data that can be formatted to be deployed as needed. However, in certain embodiments, the serverless function data 828 can be generated on the fly as needed. Additionally, certain embodiments may be configured to direct a remote or external device to transfer the serverless function data 828 to a cloud-based service provider.

In various embodiments, the storage 818 can include cloud service data 830. The cloud service data 830 can include an inventory of the various cloud-based service providers that are available for deployment. In some embodiments, the cloud service data 830 can be externally in a central database that can be accessed when needed. However, the cloud service data 830 may also be stored locally as indicated in the embodiment depicted in FIG. 8.

In still more embodiments, the storage 818 can include sustainability data 832. As described above in the discussion of FIG. 1, sustainability data can include sustainability attributes of various devices, elements, cloud-based service providers, and other components of a virtual meeting network. The sustainability data 1132 may comprise both capability data related to various devices but can also include the power source type associated with each device within a network proposed or being utilized for resource processing. In some embodiments, the sustainability data 1132 can include historical records such that decisions or inferences can be generated without all current real-time data, or to make a prediction of upcoming network conditions. Any variety of sustainability data 1132 may be utilized or formatted for use within various embodiments described herein to realize the desired application.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to generate sustainability scores in response to a sustainability profile or may evaluate the various sustainability scores to determine the best candidate cloud-based service provider to deploy a serverless function to.

Although a specific embodiment for a device 800 suitable for use in a sustainability-related serverless function deployment system according to the various steps, processes, methods, and operations described herein is discussed with respect to FIG. 8, any of a variety of systems and/or processes may be utilized in accordance with embodiments of the disclosure. For example, the device 800 may be located locally or may be distributed across a variety of devices within a network. In some embodiments, the device 800 is part of a software suite that allows for general network administration, wherein serverless function deployment is one aspect of that administration. The elements depicted in FIG. 8 may also be interchangeable with other elements of FIGS. 1-7 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory communicatively coupled to the processor;
   a communication port coupled with a plurality of cloud-based services; and
   a serverless function deployment logic configured to:
   determine at least one serverless function to deploy;
   gather data associated with the plurality of cloud-based services;
   access sustainability data including at least data identifying a current optimal daylight pattern;
   generate a sustainability score for each of a plurality of cloud-based services based on at least the current optimal daylight pattern;
   select a cloud-based service with a highest sustainability score, wherein the sustainability score is based on one or more sustainability-related attributes;
   transfer at least one serverless function to the cloud-based service with the highest sustainability score; and
   deploy at least one serverless function to the selected cloud-based service.

2. The device of claim 1, wherein the serverless function deployment logic is further configured to:
   filter the plurality of cloud-based services based on at least one service level objective; and
   select a cloud-based service from the filtered plurality of cloud-based services based on at least the accessed sustainability data.

3. The device of claim 2, wherein the serverless function deployment logic is further configured to determine if the filtered plurality of cloud-based services has any infrastructure available.

4. The device of claim 3, wherein, in response to the filtered plurality of cloud-based services having no available infrastructure, the serverless function deployment logic deploys the serverless function locally.

5. The device of claim 3, wherein, in response to the filtered plurality of cloud-based services having available infrastructure, the serverless function deployment logic determines if the at least one serverless function is transfer compliant.

6. The device of claim 5, wherein, in response to the serverless function not being transfer compliant, the serverless function deployment logic deploys the serverless function locally.

7. The device of claim 5, wherein, in response to the serverless function not being transfer compliant, the serverless function deployment logic generates a sustainability score for each cloud-based service within the filtered plurality of cloud-based services.

8. The device of claim 7, wherein the serverless function deployment logic is further configured to generate a sustainability score for a current configuration.

9. The device of claim 8, wherein the serverless function deployment logic is further configured to determine if a sustainability score from the generated sustainability scores for the filtered plurality of cloud-based services is higher than the generated sustainability score associated with the current configuration.

10. The device of claim 9, wherein, in response to a sustainability score associated with the filtered plurality of cloud-based services being higher than the sustainability score associated with the current configuration, the selection of the cloud-based service is based on the cloud-based service with a highest sustainability score.

11. The device of claim 1, wherein the sustainability data includes at least a location of the cloud-based services and their relation to a current optimal daylight pattern.

12. The device of claim 1, wherein the sustainability data includes at least: current solar photovoltaic intensity, emulated max latency, or carbon intensity data transfer cost.

13. The device of claim 12, wherein the sustainability data further includes projected estimates of the data associated with the plurality of cloud-based services.

14. The device of claim 13, wherein the sustainability data further includes historical data associated with the plurality of cloud-based services.

15. A device, comprising:
    a processor;
    a memory communicatively coupled to the processor;
    a communication port coupled with a plurality of candidate providers; and
    a serverless function deployment logic configured to:
    determine at least one serverless function to deploy;
    gather data associated with the plurality of candidate providers;
    access sustainability data including at least data identifying a current optimal daylight pattern;
    generate a sustainability score for each of the plurality of candidate providers wherein the sustainability score is based on one or more sustainability-related attributes and the current optimal daylight pattern;
    compare the generated sustainability score of each of the plurality of candidate providers against a sustainability score of a current configuration;
    transfer at least one serverless function to the candidate provider with a highest sustainability score; and
    deploy at least one serverless function to a candidate provider with the highest sustainability score.

16. The device of claim 15, wherein the plurality of candidate providers are cloud-based service providers.

17. The device of claim 16, wherein the serverless function deployment logic is further configured to:
    filter the plurality of cloud-based service providers based on at least one service level objective; and
    generate a sustainability score for each of the filtered plurality of cloud-based service providers.

18. A method of deploying serverless functions, comprising:
    determining at least one serverless function to deploy;
    gathering data associated with a plurality of candidate providers;
    accessing sustainability data including at least data identifying a current optimal daylight pattern;

generating a sustainability score for a candidate provider wherein the sustainability score is based on one or more sustainability-related attributes and the current optimal daylight pattern;

comparing the generated sustainability score of each of the plurality of candidate providers against a sustainability score of a current configuration;

transferring at least one serverless function to a candidate provider with a highest sustainability score; and deploying at least one serverless function to a selected candidate provider.

19. The method of claim 18, wherein the plurality of candidate providers are cloud-based service providers.

20. The method of claim 19, wherein the method further comprises:

filtering the plurality of cloud-based service providers based on at least one service level objective; and generating a sustainability score for each of the filtered plurality of cloud-based service providers.

\* \* \* \* \*